United States Patent
Tanoue et al.

(10) Patent No.: US 7,512,057 B2
(45) Date of Patent: Mar. 31, 2009

(54) LASER PULSE CONTROL CIRCUIT

(75) Inventors: Katsuya Tanoue, Gifu (JP); Kenichi Ikegami, Aichi (JP); Naoya Yamakawa, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 56 days.

(21) Appl. No.: 10/599,742

(22) PCT Filed: Apr. 1, 2005

(86) PCT No.: PCT/JP2005/006502

§ 371 (c)(1),
(2), (4) Date: Jul. 23, 2007

(87) PCT Pub. No.: WO2005/098836

PCT Pub. Date: Oct. 20, 2005

(65) Prior Publication Data

US 2007/0274191 A1   Nov. 29, 2007

(30) Foreign Application Priority Data

Apr. 9, 2004   (JP) .............................. 2004-115954

(51) Int. Cl.
G11B 7/00   (2006.01)
(52) U.S. Cl. .................... 369/116; 369/59.11; 369/47.5
(58) Field of Classification Search ........................ None
See application file for complete search history.

(56) References Cited

U.S. PATENT DOCUMENTS 5,848,045 A * 12/1998 Kirino et al. ............. 369/47.53

6,714,230 B2 * 3/2004 Shimizu ................... 369/13.24

FOREIGN PATENT DOCUMENTS

| JP | 4-196592 | 7/1992 |
|---|---|---|
| JP | 2001-34987 | 1/1995 |
| JP | 2001-229561 | 8/2001 |

OTHER PUBLICATIONS

PCT International Search Report for Application No. PCT/JP2005/006502, dated Jun. 30, 2005 (3 pages).

* cited by examiner

Primary Examiner—Muhammad N. Edun
(74) Attorney, Agent, or Firm—Fish & Richardson P.C.

(57) ABSTRACT

Disclosed is a laser pulse controlling circuit that, when the laser device is driven with laser pulses having the first and the second illumination levels, causes the first and the second illumination level setting units to set the first and the second illumination levels corresponding to a predetermined ratio of the first illumination level to the second illumination level, wherein the laser pulse controlling circuit, based on regularity that the relation between: a manipulated variable for causing the second illumination level setting unit to execute adjustment of the second illumination level; and the inverse of the ratio, with reference to the first illumination level, is a straight line that necessarily passes one point for a predetermined first illumination level, and that the slope of the straight line is proportional to an arbitrary first illumination level, calculates the manipulated variable that is correlated with the first illumination level corresponding to the optical disk, and with the inverse of the ratio, and causes the second illumination level setting unit to set the second illumination level corresponding to the calculated manipulated variable.

6 Claims, 10 Drawing Sheets

FIG. 10

LASER PULSE CONTROL CIRCUIT

CROSS-REFERENCE TO RELATED APPLICATION

This application claims the benefit of priority to International Patent Application PCT/JP2005/006502, filed Apr. 1, 2005, of which full contents are incorporated herein by reference.

BACKGROUND OF THE INVENTION

1. Technical Field

The present invention relates to a laser pulse controlling circuit.

2. Description of the Related Art

Phase-change optical disks (CD-RW, DVD±RW, DVD-RAM, etc.) are prevailing as rewritable optical disks. In a phase-change optical disk, when a laser light beam having laser power at a predetermined level or higher is applied to a recording layer and, thereafter, the recording layer is rapidly cooled, the recording layer is in an amorphous state. When a laser light beam having laser power that is lower than the laser power with which the amorphous state is formed is applied to a recording layer and, thereafter, the recording layer is slowly cooled, the recording layer is in a crystal state.

In this manner, in a phase-change optical disk, information can be recorded on a recording face by suitably using either one of the two types of laser light beams. According to the standard for the phase-change optical disks, laser power at the level that forms the amorphous state is defined as laser power for recording of information into an optical disk (hereinafter, "writing power PW") and laser power of the level that forms the crystal state is defined as laser power for erasing of information recorded in the optical disk (hereinafter, "erasing power PE"). Recording is usually executed using laser pulses having power levels respectively of three values including bias power PB that is lower than the erasing power PE.

An optical disk apparatus that executes recording and reproducing to/from a phase-change optical disk is configured by combining, for example, an optical pickup having a laser diode (hereinafter, "LD"), a front monitor diode (hereinafter, "FMD"), an LD driving circuit, etc.; an analog signal processing circuit that executes processing of an optical disk driving analog signal (such as amplification of an RF/HF signal, AGC (Automatic Gain Control), APC (Automatic Power Control), and production of a servo controlling signal); and a digital signal processing circuit that executes processing of an optical disk driving digital signal (such as encoding/decoding and digital servo).

The analog signal processing circuit has a writing power setting unit that especially produces a voltage controlling signal VWDC to set the writing power PW and supplies the signal VWDC to the LD driving circuit; an erasing power setting unit that produces a voltage controlling signal VEDC to set the erasing power PE and supplies the signal VEDC to the LD driving circuit; and a bias power setting unit that produces a voltage controlling signal VBDC to set the bias power PB and supplies the signal VBDC to the LD driving circuit. Therefore, the LD driving circuit drives the LD using laser pulses at power levels of three values respectively corresponding to the voltage controlling signals VWDC, VEDC, and VBDC. The digital signal processing circuit constitutes a laser pulse controlling circuit that targets especially the writing power setting unit and the erasing power setting unit to control.

Before actual recording is started, the laser pulse controlling circuit adjusts Epsilon that is the ratio of the erasing power PE to the writing power PW (PE/PW) through the control executed to the writing power setting unit and the erasing power setting unit. The purpose of the Epsilon adjustment is to set the writing power PW and the erasing power PE respectively to proper levels that match with the conditions specific to a medium such as the material and recording speed of the medium and the environmental conditions in question (such as temperature).

Figure 10:
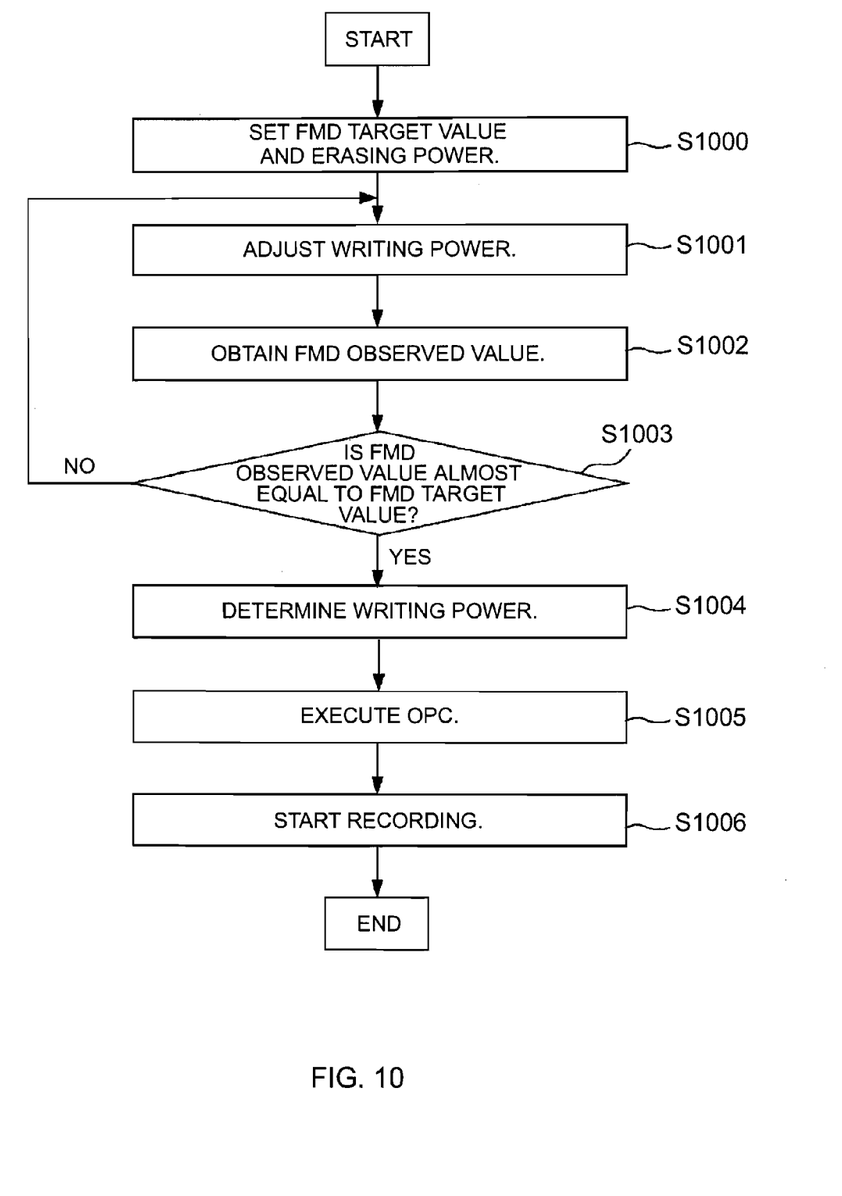
FIG. 10 is an explanatory flowchart of conventional Epsilon adjustment.

FIG. 10 is an explanatory flowchart of the Epsilon adjustment by a conventional laser pulse controlling circuit.

It is assumed that a proper light-receiving level at FMD (hereinafter, "FMD target value") obtained when a predetermined Epsilon is set is statistically obtained using experimental data obtained from a plurality of experimental optical disk apparatuses. Before starting OPC (Optimum Power Control) that executes test writing to a PCA (Power Calibration Area) provided on a phase-change optical disk, the conventional laser pulse controlling circuit determines Epsilon (hereinafter, "Epsilon recommended value") and the erasing power PE to be set for this recording. At this time, an FMD target value corresponding to the Epsilon recommended value is also determined together (S1000).

As the writing power PW is increased stepwise (S1001), when each increment is completed, the average value of the light-receiving level per predetermined time period observed by the FMD (hereinafter, "FMD observed value") is obtained through an LPF (Low Pass Filter), etc. (S1002). At this time, when the FMD observed value does not exceed the FMD target value (S1003: NO), the next stepwise adjustment of the writing power PW is executed. When the FMD observed value exceeds the FMD target value for the first time (S1003: YES), the writing power PW at this time is the writing power PW corresponding to the Epsilon recommended value and the erasing power PE to be set this time (S1004).

Therefore, after applying multi-pulse modulation to the laser pulses by the erasing power PE and the writing power PW determined as above, an OPC process is executed (S1005) and recording with actual recording data is started (S1006).

As above, during the Epsilon adjustment, the conventional laser pulse controlling circuit executes repeatedly for many times the stepwise adjustment of the writing power using the FMD observed value as level adjustment of laser pulses disclosed in, for example, Patent Document 1 shown below.

Patent Document: Japanese Patent Application Laid-Open Publication No. 2001-34987

As shown in FIG. 10, the conventional laser pulse controlling circuit executes repeatedly for many times the acquisition of the FMD observed value and the stepwise adjustment of the writing power PW based on the FMD observed values until the setting of the power levels of the writing power PW and the erasing power PE corresponding to the Epsilon recommended values is completed.

Therefore, a problem has arisen that a long time period is needed before the OPC process is started, and that in turn the start of actual recording is delayed. By receiving for many times the influence of the precision of the FMD, the writing power PW is not set to an expected power level and the precision of the Epsilon adjustment may be degraded.

SUMMARY OF THE INVENTION

In order to solve the above problem, a major aspect of the present invention provides a laser pulse controlling circuit that is connected with a controlling unit having a first illumination level setting unit that sets a first illumination level of a laser device to erase information recorded in an optical disk, and a second illumination level setting unit that sets a second illumination level of the laser device to record information into the optical disk, and that, when the laser device is driven with laser pulses having the first and the second illumination levels, causes the first and the second illumination level setting units to set the first and the second illumination levels corresponding to a predetermined ratio of the first illumination level to the second illumination level, wherein the laser pulse controlling circuit, based on regularity that the relation between: a manipulated variable for causing the second illumination level setting unit to execute adjustment of the second illumination level; and the inverse of the ratio, with reference to the first illumination level, is a straight line that necessarily passes one point for a predetermined first illumination level, and that an intersecting angle between the straight line and a predetermined reference line is proportional to the predetermined first illumination level, calculates the manipulated variable that is correlated with the first illumination level corresponding to the optical disk, and with the inverse of the ratio, and causes the second illumination level setting unit to set the second illumination level corresponding to the calculated manipulated variable.

According to the present invention, there can be provided a laser pulse controlling circuit that executes properly the Epsilon adjustment.

BRIEF DESCRIPTION OF THE DRAWINGS

For more complete understanding of the present invention and the advantages thereof, the following description should be referred to with the accompanying drawings.

DETAILED DESCRIPTION OF THE INVENTION

At least the following items will be clear according to the specification and description of the accompanying drawings.

<System Configuration>

Figure 1:
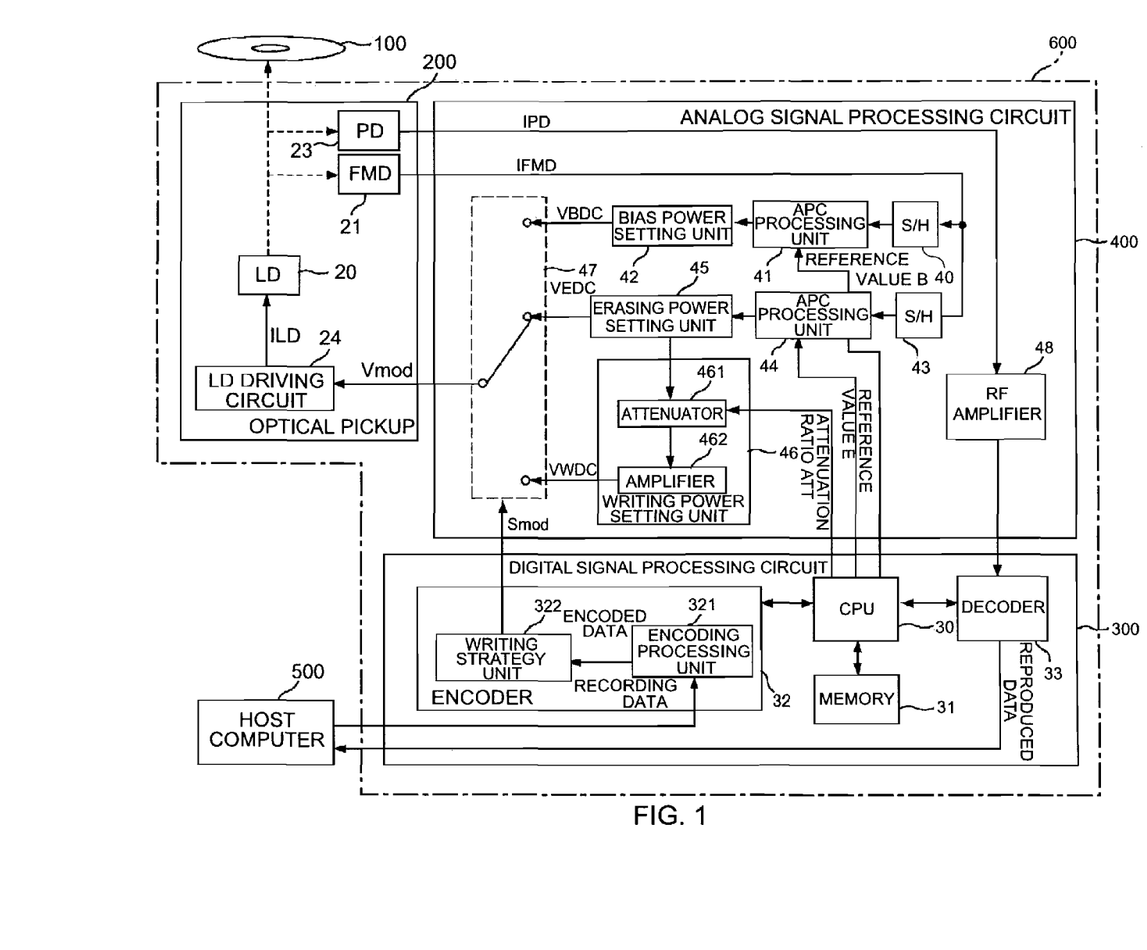
FIG. 1 is an explanatory view of the entire configuration of an optical disk system according to an embodiment of the present invention.

FIG. 1 shows the entire configuration of an optical disk apparatus 600 including a laser pulse controlling circuit according to an embodiment of the present invention. An optical disk 100 that is the target in the embodiment is a rewritable phase-change optical disk (a CD-RW, a DVD±RW, a DVD-RAM, etc.).

An optical disk apparatus 600 is configured mainly with an optical pickup 200, a digital signal processing circuit 300, and an analog signal processing circuit 400. The optical disk apparatus 600 is connected communicably with an external host computer 500.

Optical Pickup

The optical pickup 200 includes an LD (Laser Diode) 20, an FMD (Front Monitor Diode) 21, a PD (Photo Detector) 23, an LD driving circuit 24 and, in addition, an optical lens, servo actuator, etc., (all not shown).

The LD 20 is a semiconductor laser device that applies a laser light beam to execute recording and reproducing to/from the optical disk 100 based on a driving current ILD supplied from the LD driving circuit 24. To employ a phase-change optical disk as the optical disk 100, when the LD 20 is driven, laser pulses applied with a multi-pulse modulation scheme (hereinafter, "multi-pulse modulation pattern") is usually used. A laser pulse pattern like the multi-pulse modulation pattern is commonly referred to as "writing strategy".

Figure 9:
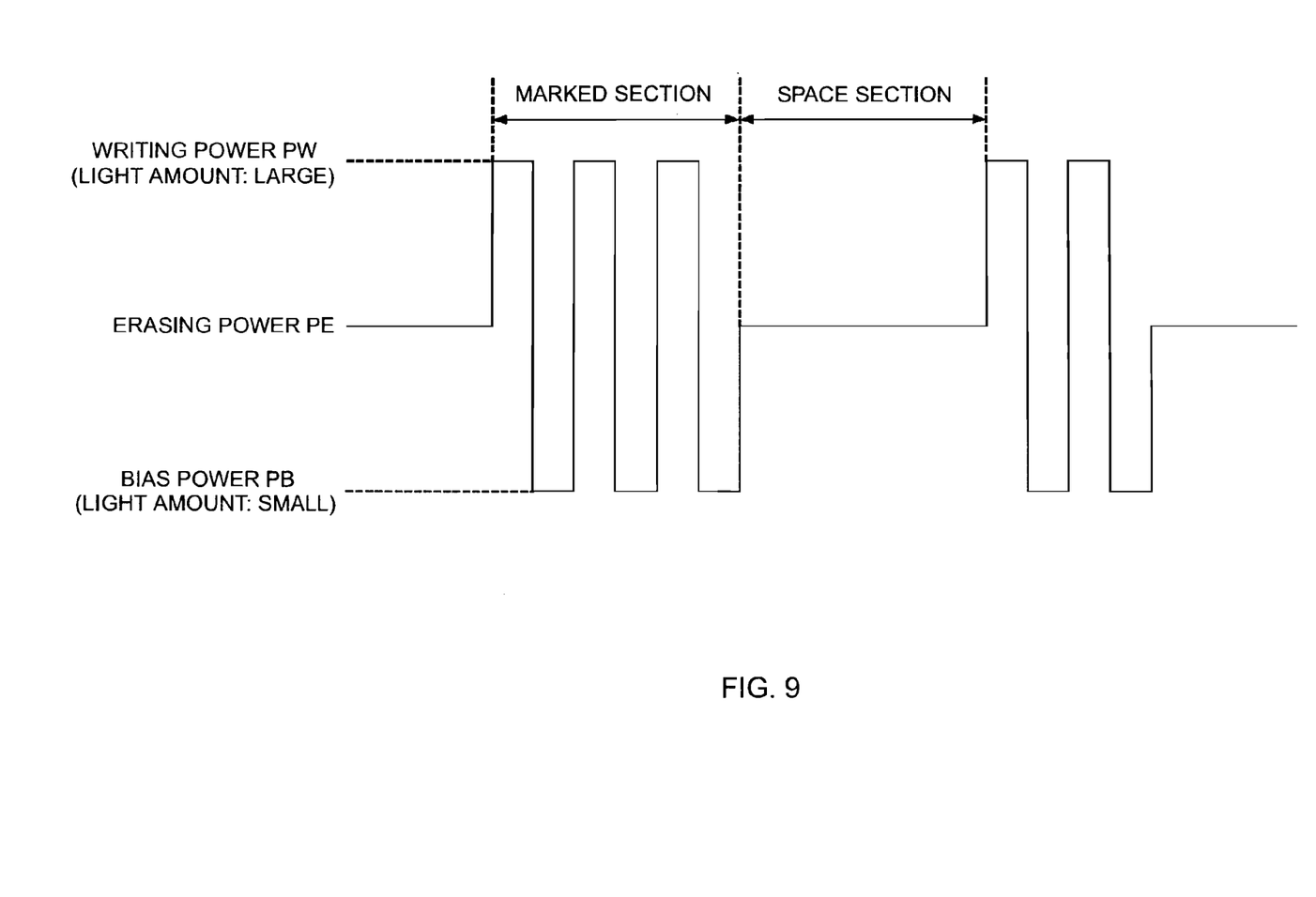
FIG. 9 shows a waveform of laser pulses obtained when a multi-pulse modulation scheme is employed.

An example of the multi-pulse modulation pattern is shown in FIG. 9. The multi-pulse modulation pattern includes power levels of three values of an erasing power PE to erase information recorded in the optical disk 100 (a "first illumination level"), a writing power PW to record information to the optical disk 100 (a "second illumination level"), and a bias power PB.

That is, to a space section that forms no recorded marks on the optical disk 100, a laser light beam having the erasing power PE is applied from the LD 20 and, to a marked section that is formed with recorded marks on the optical disk 100, a laser light beam of a pulse string having amplitudes of the writing power PW (a peak level) and the bias power PB (a bottom level) is applied from the LD 20. According to the multi-pulse modulation scheme, in the marked section, a section that is applied with the bias power PB is a cooling section and equalization of the heat distribution can be facilitated.

The FMD 21 receives the laser light beam applied to the optical disk 100 from the LD 20 and produces a light-receiving current IFMD that is in proportion to the amount of the received light. The light-receiving current IFMD is in proportion to the illuminating power. Therefore, the FMD 21 can be said to be a light-receiving device to observe the illuminating power of the LD 20. The light-receiving current IFMD produced by the FMD 21 is converted into a light-receiving voltage VFMD through an I/V converter (not shown) and is supplied to S/H units 40 and 43.

When information recorded in the optical disk 100 is reproduced, as to a laser light beam applied from the LD 20, the PD 23 receives a reflected light beam from the optical disk 100 and produces a light-receiving current IPD that is in proportion to the amount of the received light. The light-receiving current IPD produced by the PD 23 is converted into a light-receiving voltage VPD through an I/V converter (not shown) and is supplied to an RF amplifier 48.

The LD driving circuit 24 produces a driving current ILD corresponding to a modulating signal Vmod based on the modulating signal Vmod supplied from a switch 47. The LD driving circuit 24 drives the LD 20 with the driving current ILD.

For reproducing of the optical disk, the modulating signal Vmod based only on a controlling signal VBDC from a bias power setting unit 42 is supplied to the LD driving circuit 24 through the switch 47.

For recording of the optical disk, the controlling signal VBDC outputted from the bias power setting unit 42, a controlling signal VEDC outputted from an erasing power setting unit 45, and a controlling signal VWDC outputted from a writing power setting unit 46 are integrated by the switch 47 and, as a result, a modulating signal Vmod with a predetermined pattern formed therein is supplied to the LD driving circuit 24.

Digital Signal Processing Circuit

The digital signal processing circuit 300 is an integrated circuit that executes digital signal processing for an optical disk driving (digital servo, encoding/decoding, etc.). The laser pulse controlling circuit according to an embodiment of the present invention is implemented as the digital signal processing circuit 300. Each of the functions such as the digital servo, the encoding/decoding, etc., that the digital signal processing circuit 300 has may be implemented as one separate chip. That is, the laser pulse controlling circuit according to an embodiment of the present invention may be implemented as one chip alone.

A CPU 30 administers the system control of the entire digital signal processing circuit 300 and, finally, the entire optical disk apparatus 600. Functions that the CPU 30 has are implemented as firmware (a program) and is stored in a memory 31 accessible from the CPU 30. The functions that the CPU 30 has may be realized as hardware (a circuit). Instead of the CPU 30, a microprocessor or a microcomputer may be employed.

The CPU 30 executes the following processes to cause an APC (Automatic Power Control) processing units 41 and 44 and an attenuator 461 to operate at a proper timing to execute proper Epsilon adjustment that meets the conditions specific to the optical disk 100 (the recording speed, the material, etc.) especially before the OPC process is started for recording to the optical disk.

When identification data of the optical disk 100 recorded in advance on the optical disk 100 is reproduced, as a preparatory process for the Epsilon adjustment, the CPU 30 sets in the APC processing unit 41 a reference value B to set the illumination level of the LD 20 to a predetermined read power (similarly to the bias power PB). The reference value B that the CPU 30 handles is a digital value. Therefore, when the CPU 30 specifies the reference value B to the APC processing unit 41, an analog value formed by D/A-converting the reference value B (digital value) from the CPU 30 is supplied to the APC processing unit 41.

When the Epsilon is adjusted, the CPU 30 specifies the reference value B to the APC processing unit 41 as a manipulated variable to set the bias power PB in the marked section of the multi-pulse modulation pattern. Similarly, in this case, when the CPU 30 specifies the reference value B to the APC processing unit 41, an analog value formed by D/A-converting the reference value B (a digital value) from the CPU 30 is supplied to the APC processing unit 41.

When the Epsilon is adjusted, the CPU 30 specifies the reference value E to the APC processing unit 44 as a manipulated variable to set the erasing power PB in the space section of the multi-pulse modulation pattern. Similarly, in this case, when the CPU 30 specifies the reference value E to the APC processing unit 44, an analog value formed by D/A-converting the reference value E (a digital value) from the CPU 30 is supplied to the APC processing unit 44.

When the Epsilon is adjusted, the CPU 30 specifies an attenuation ratio ATT to the attenuator 461 as a manipulated variable to set the writing power PW in the marked section of the multi-pulse modulation pattern. Similarly, in this case, when the CPU 30 specifies the attenuation ratio ATT to the attenuator 461, an analog value formed by D/A-converting the attenuation ratio ATT (a digital value) from the CPU 30 is supplied to the attenuator 461.

The memory 31 employs a nonvolatile memory such as an EEPROM to always store a program that the CPU 30 runs and data that the program uses.

Describing the details later, as data used for determining an APCATT calculating straight line ("straight line") in the Epsilon adjustment of the present invention, the memory 31 stores in advance either one of a first reference straight line that correlates an attenuation ratio ATT with 1/Epsilon (an inverse of the Epsilon) when the erasing power PE is 7.0 mW or a second reference straight line that correlates an attenuation ratio ATT with 1/Epsilon (an inverse of the Epsilon) when the erasing power PE is 10.0 mW, an intersection (X0, Y0), and a intersecting angle varying rate $\Delta\theta$. Thereby, it is not necessary to transfer the above data from an external apparatus (for example, the host computer 500) every time the Epsilon adjustment is executed and, therefore, improvement of the adjustment speed of the Epsilon adjustment can be facilitated.

The memory 31 stores in advance the Epsilon recommended value and the reference value E to set the erasing power PE, correlated with identifying data of the optical disk 100. Thereby, when the Epsilon that is the reference in the Epsilon adjustment and the erasing power PE are determined, like the conventional case, recording administering information such as the Epsilon recommended value defined in advance as a pre-format on the optical disk 100 does not need to be read and a predetermined decoding process does not need to be applied to the entire recording administering information. As a result, improvement of the speed of the Epsilon adjustment can be facilitated because the load of determining the Epsilon can be omitted.

The encoder 32 has an encoding processing unit 321 and a writing strategy unit 322.

In recording of the optical disk, the encoding processing unit 321 executes a predetermined encoding process supporting the optical disk 100.

The writing strategy unit 322 produces a modulation switching signal Smod based on recorded data applied with the predetermined encoding process by the encoding processing unit 321 (hereinafter, "encoded data") and supplies the modulation switching signal Smod to the switch 47. As a result, a modulation signal Vmod is produced by switching operation of the switch 47 based on the modulation switching signal Smod and the LD 20 is driven according to the multi-pulse modulation pattern.

In reproducing of the optical disk, the decoder 33 executes a predetermined decoding process to an RF signal reproduced from the optical disk 100. The data applied with the decoding process (hereinafter, "reproduced data") is supplied to the host computer 500. The decoder 33 executes a predetermined decoding process to extract the identifying data of the optical disk 100 from ATIP information (in case of a CD-RW medium) or wobbling information (in case of a DVD±RW medium) reproduced from the optical disk 100. As a result, the identifying data of the optical disk 100 is decoded and is supplied to the CPU 30.

Analog Signal Processing Circuit

The analog signal processing circuit 400 executes optical disk driving analog signal processes such as amplification of an RF/HF signal, AGC (Automatic Gain Control), APC (Automatic Power Control), and production of servo controlling signal. The analog signal processing circuit 400 is an embodiment of a controlling unit of the present invention and is implemented being connected with the digital signal processing circuit 300.

In reproducing of the optical disk or in recording of the optical disk, when the bias power PB in the marked section of the multi-pulse modulation pattern is set, an S/H (Sample Holding) unit 40 sample-holds the light-receiving voltage VFMD produced through the FMD 21 during a predetermined sampling term. At this time, the signal being sample-held is referred to as "BSHO signal". The BSHO signal is supplied to the APC processing unit 41.

In recording of the optical disk, when the erasing power PE in the space section of the multi-pulse modulation pattern is set, an S/H (Sample Holding) unit 43 sample-holds the light-receiving voltage VFMD produced through the FMD 21 during a predetermined sampling term. At this time, the signal being sample-held is referred to as "WSHO signal". The WSHO signal is also supplied to the APC processing unit 44.

The APC processing unit 41 obtains a differential voltage corresponding to the deviation between the level of an RSHO signal sample-held by the S/H unit 40 and the reference value B supplied from the CPU 30 through the D/A conversion. The APC processing unit 41 executes the APC to decrease the differential voltage.

Similarly, the APC processing unit 44 obtains a differential voltage corresponding to the deviation between the level of the WSHO signal sample-held by the S/H unit 43 and the reference value E supplied from the CPU 30 through the D/A conversion. The APC processing unit 44 executes the APC to decrease the differential voltage.

Based on the APC output from the APC processing unit 41, the bias power setting unit 42 produces a voltage controlling signal VBDC to set the bias power PB to a power level corresponding to the reference value B. When the voltage controlling signal VBDC is selected by the switching operation of the switch 47, the signal VBDC is supplied to the LD driving circuit 24.

Based on the APC output from the APC processing unit 44, the erasing power setting unit 45 produces a voltage controlling signal VEDC to set the erasing power PE to a power level corresponding to the reference value E. When the voltage controlling signal VEDC is selected by the switching operation of the switch 47, the signal VEDC is supplied to the LD driving circuit 24.

The writing power setting unit 45 shifts the level of the voltage controlling signal VEDC from the erasing power setting unit 45 based on an APCATT (dB) that is a level-shift amount determined by the attenuation ratio ATT of the attenuator 461 supplied from the CPU 30 through the D/A conversion and a predetermined fixed amplification ratio of an amplifier 462. A signal level-shifted from the voltage controlling signal VEDC is a voltage controlling signal VWDC to set the writing power PW to a power level corresponding to the APCATT. When the voltage controlling signal VWDC is selected by the switching operation of the switch 47, the signal VWDC is supplied to the LD driving circuit 24.

The RF amplifier 48 amplifies the light-receiving voltage VPD produced through the PD 23 by a predetermined amplification ratio and, thereby, produces an RF signal. The RF amplifier 48 produces ATIP information (for a CD-RW medium) or wobbling information (for a DVD±RW medium) that includes the identification data of the optical disk 100. The RF signal and ATIP information/wobbling information are supplied to the decoder 33.

Though the embodiment of the analog signal processing circuit 400 has been described as above, for example, the writing power setting unit 46 may be configured only with one variable gain amplifier that shifts the level of the controlling voltage signal VEDC. In this case, the CPU 30 specifies the level shift amount in the above variable gain amplifier to the wiring power setting unit 46.

<Relation Between Epsilon and APCATT>

Figure 2:
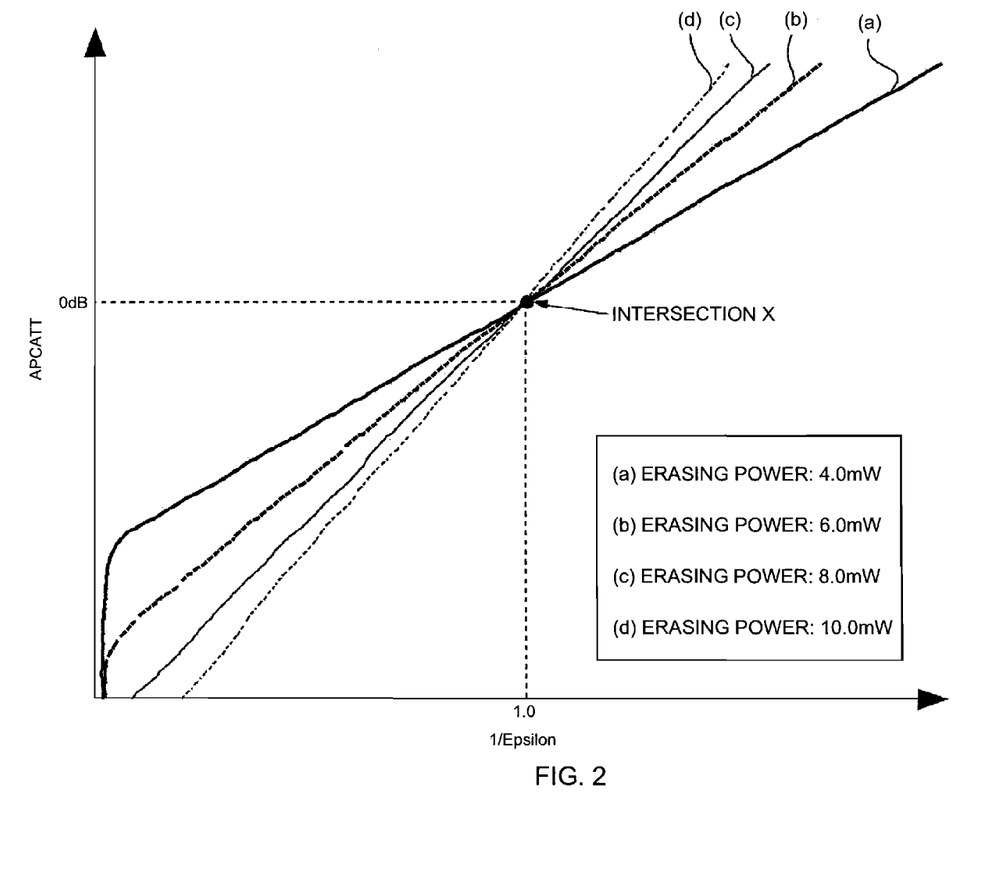
FIG. 2 is an explanatory view of the relation between 1/Epsilon and APCATT.

Referring to FIG. 2, description will be given for a relation established between the Epsilon and the APCATT with reference to the erasing power PE noted in discussing the Epsilon adjustment of the present invention.

As shown in (a) to (d) of FIG. 2, for any erasing power PE, it can be confirmed that, as the inverse of the Epsilon (writing power PW/erasing power PE) becomes larger, the APCATT also becomes larger. The APCATT is a level shift amount against the erasing power PE to determine the writing power PW. That is, a proportional relation is established between the inverse of the Epsilon and the APCATT. Hereinafter, the proportional relation is represented as a straight line that correlates the inverse of the Epsilon with the APCATT.

As shown in (a) to (d) of FIG. 2, it can be confirmed that, for any erasing power PE, a straight line that correlates the inverse of the Epsilon with the APCATT intersects other such lines at one point X. The one point X represents the case where the Epsilon is 1.0 and the APCATT is 0 dB. That is, when the Epsilon is 1.0, the writing power PW and the erasing power PE respectively have the same power levels and, in this case, the APCATT is determined uniquely as 0 dB that results in no amplification and no attenuation of erasing power PE being executed in the writing power setting unit 46 regardless of the erasing power PE. That is, the state represented by the point X is the state where no influence of the controlling properties of the attenuator 461 and the amplifier 462 is received.

As shown in (a) to (d) of FIG. 2, it can be confirmed that the slope of the straight line that correlates the inverse of the Epsilon with the APCATT becomes steeper corresponding to the rate of increase of the erasing power PE. That is, a proportional relation is established between the erasing power PE and the slope of the straight line that correlates the inverse of the Epsilon with the APCATT.

<Acquisition of Reference Straight Line, Intersection, Intersecting Angle Varying Rate>

The Epsilon adjustment of the present invention utilizes regularity such as the proportional relation established between the inverse of the Epsilon and the APCATT; a relation that the straight line representing the proportional relation necessarily passes one point X for any erasing power PE; and the proportional relation established between the slope of the straight line that correlates the inverse of the Epsilon and the APCATT with the erasing power PE.

To identify the above regularity in the course of the Epsilon adjustment of the present invention, for example, as described below, two arbitrary erasing powers PE are determined, and two reference straight lines that represent the proportional relation between the inverse of the Epsilon and the APCATT, with reference to the erasing powers PE, are obtained. The intersecting point X, the intersecting angle varying rate $\Delta\theta$ that corresponds to the proportional relation between the erasing power PE and the slope of the straight line are obtained from the two reference straight lines.

Reference Straight Line

Figure 3:
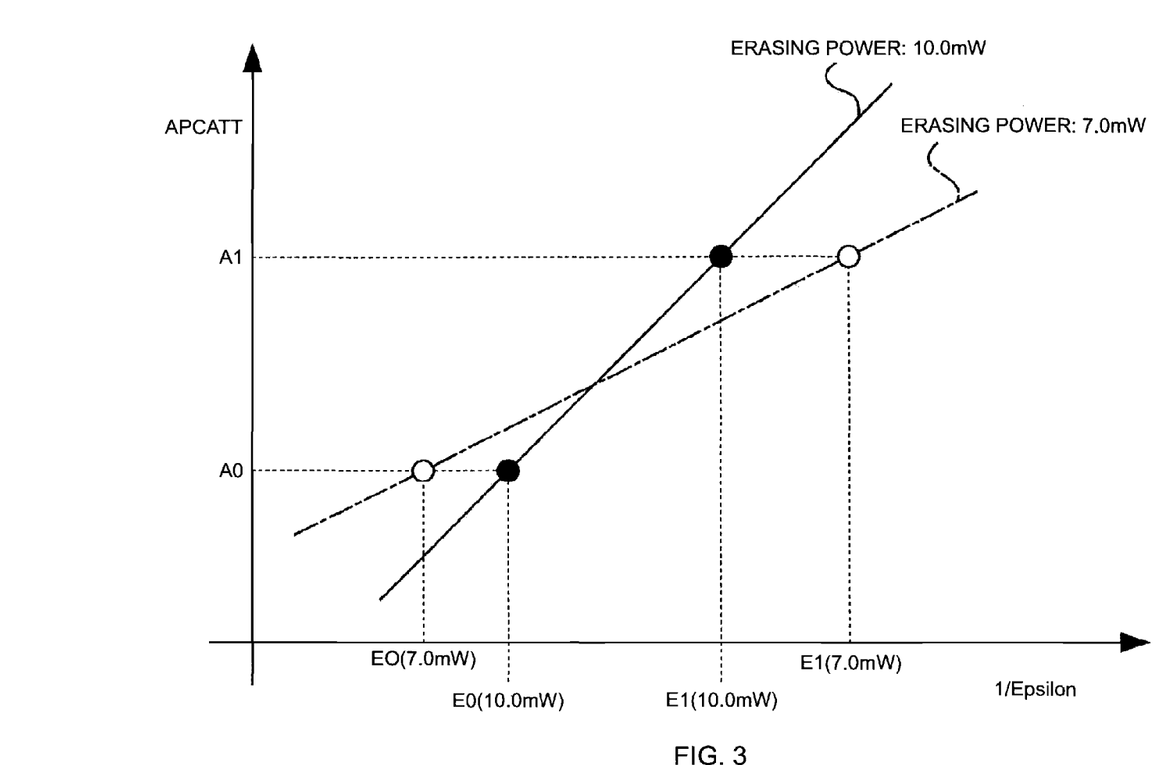
FIG. 3 is an explanatory view of a method of obtaining a reference straight line according to an embodiment of the present invention.
Figure 4:
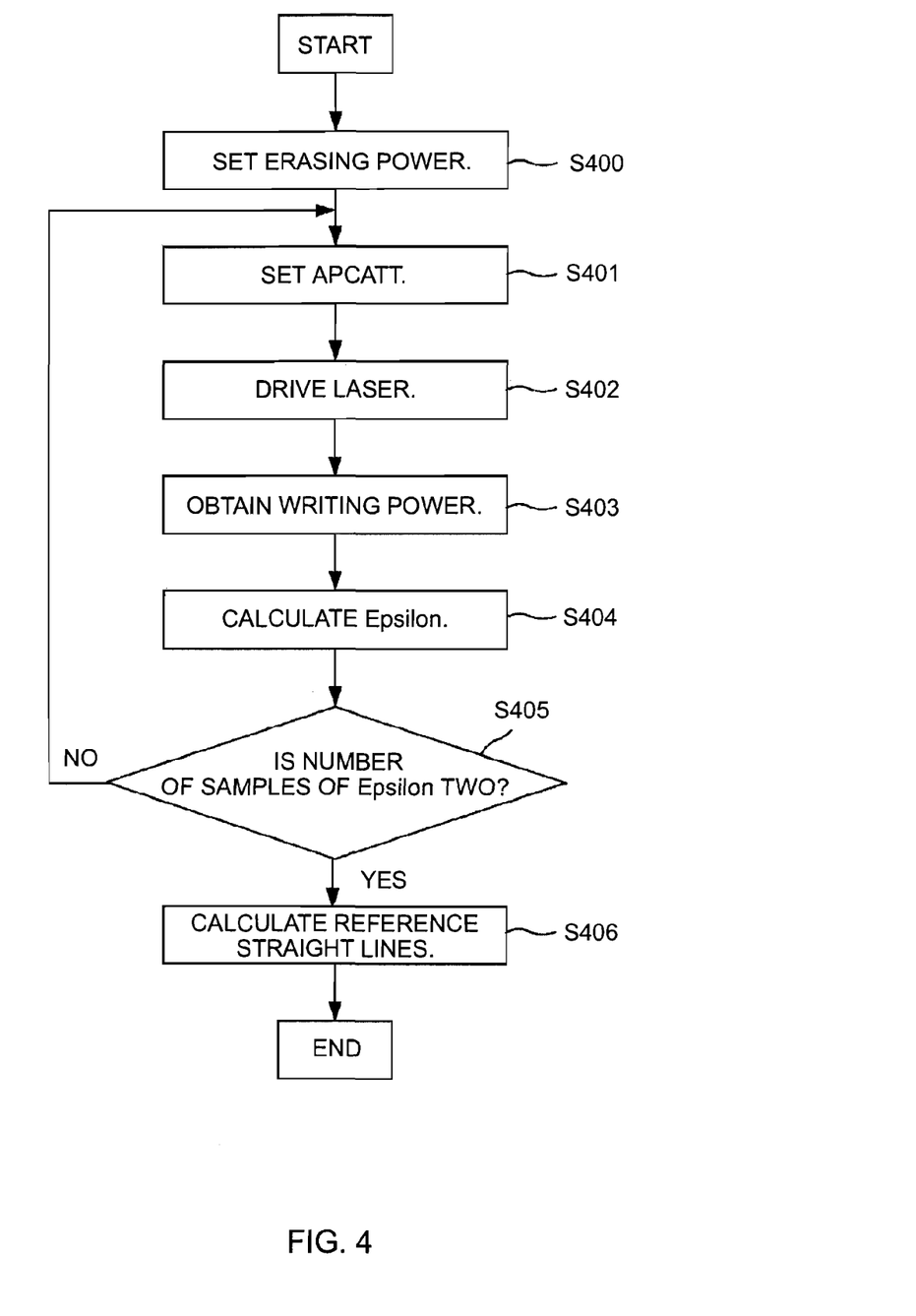
FIG. 4 is an explanatory flowchart of the method of obtaining the reference straight line according to an embodiment of the present invention.

Referring to a flowchart of FIG. 4, description will be given for a method of obtaining the two reference straight lines that represent the proportional relation between the inverse of the Epsilon and the APCATT for each of the two arbitrary erasing powers PE referring also to FIG. 3 when necessary. For convenience of the description of the flowchart of FIG. 4, the case will be described where a non-multi-pulse modulation scheme that does not execute any setting of the bias power PB is employed.

As the two arbitrary erasing powers PE, power levels included within the range defined as the erasing power PE are employed. For example, according to a CD-RW standard (Orange Book), the erasing power PE is defined as 7.0 mW for the minimum thereof and 15.0 mW for the maximum thereof. Therefore, as the two arbitrary erasing powers PE, for example, 7.0 mW and 10.0 mW are employed as power levels within the range defined between 7.0 mW and 15.0 mW. In this manner, by employing two arbitrary power levels within the range defined for the erasing power PE, the proper data to execute the Epsilon adjustment (the straight lines, the intersections, and the intersecting angle varying rate) can be obtained.

It is assumed that a power meter (not shown) to measure the illuminating power of the LD 20 is disposed in advance at a position at which the laser light beam applied from the LD 20 can be observed. In this state, the CPU 30 specifies the reference value E to set the erasing power PE of 7.0 mW to the APC processing unit 44 (S400). The CPU 30 specifies the attenuation ratio ATT corresponding to a predetermined APCATT (A0) to the attenuator 461 (S401). As a result, the erasing power setting unit 45 produces the voltage controlling signal VEDC to set the erasing power PE to 7.0 mW and the writing power setting unit 46 produces the voltage controlling signal VWDC level-shifted from the voltage controlling signal VEDC by the level of the APCATT (A0).

Based on the switching modulating signal Smod from the writing strategy unit 322, the switch 47 produces the modulating signal Vmod by combining the voltage controlling signal VEDC produced by the erasing power setting unit 45 and the voltage controlling signal VWDC produced by the writing power setting unit 46. The modulating signal Vmod is supplied to the LD driving circuit 22 and, as a result, the LD 20 is driven (S402).

At this time, the power meter especially obtains W0 (7.0 mW) as first measured data of the writing power PW in the marked section as the illuminating power of the LD 20 (S403). Therefore, first sample data E0 (7.0 mW) of the Epsilon is extracted by calculating the ratio of 7.0 mW to W0 (7.0 mW) (7.0 mW/W0 (7.0 mW)) (S404).

Because sample data of the Epsilon has not been extracted for two samples (S405: NO), the CPU 30 specifies newly the attenuation ratio ATT corresponding to a predetermined APCATT (A1) to the attenuator 461 without changing the setting of the erasing power PE (S401). The erasing power PE and the writing power PW have been set and the LD 20 is driven (S402). As a result, the power meter obtains W1 (7.0 mW) as a second measured data of the writing power PW in the marked section (S403). Therefore, second sample data E1 (7.0 mW) of the Epsilon is extracted by calculating the ratio of 7.0 mW to W1 (7.0 mW) (7.0 mW/W1 (7.0 mW)) (S404).

When the two pieces of sample data E0 (7.0 mW) and E1 (7.0 mW) are extracted as the Epsilon (S405: YES), two different pieces of coordinate data (E0 (7.0 mW), APCATT (A0)) and (E1 (7.0 mW), APCATT (A1)) are obtained that are defined by the coordinate axes of APCATT vs. (1/Epsilon). Therefore, by connecting these two pieces of coordinate data with a straight line, a first reference straight line (hereinafter, "first reference straight line") can be obtained (S406).

A same procedure is taken for the case where the erasing power PE is 10.0 mW and, thereby, (E0 (10.0 mW) APCATT (A0)) and (E1 (10.0 mW), APCATT (A1)) are extracted as two pieces of sample data of the Epsilon, that is two pieces of coordinate data. By connecting these two pieces of coordinate data with a straight line, a second reference straight line (hereinafter, "second reference straight line") can be obtained (S406).

In this manner, the first and the second reference straight lines can be easily determined only by extracting the two pieces of coordinate data for a predetermined erasing power PE. By determining the first and the second reference straight lines, the intersection and the intersecting angle varying rate can be determined in general. Therefore, the complicated work including collecting the statistics of a large amount of experimental data obtained from a plurality of experimental optical disk apparatuses and obtaining experimental formulas from the statistics as in the conventional case are not necessary and the data necessary for the Epsilon adjustment of the present invention can be easily obtained.

When further improvement of the precision of the first and the second reference straight lines is desired to be facilitated, the first and the second reference straight lines may be determined by straight line approximation using a plurality of pieces of coordinate data more than two pieces.

Intersection and Intersecting Angle Varying Rate

Figure 5:
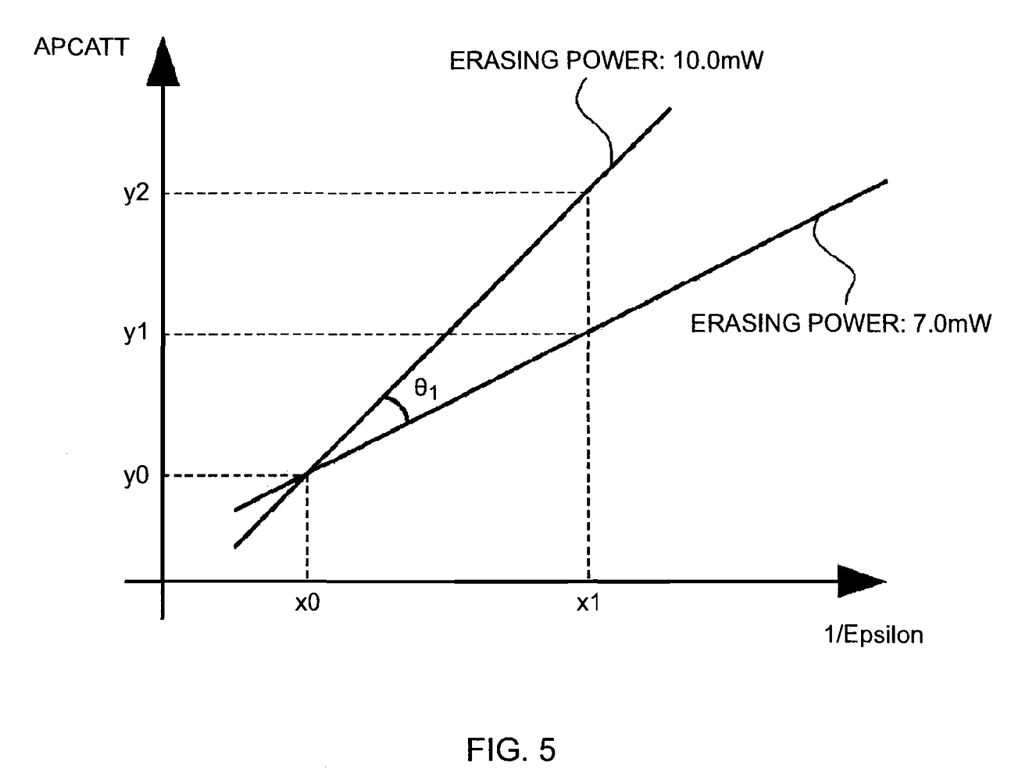
FIG. 5 is an explanatory view of a method of obtaining an intersection and intersecting angle varying rate according to an embodiment of the present invention.
Figure 6:
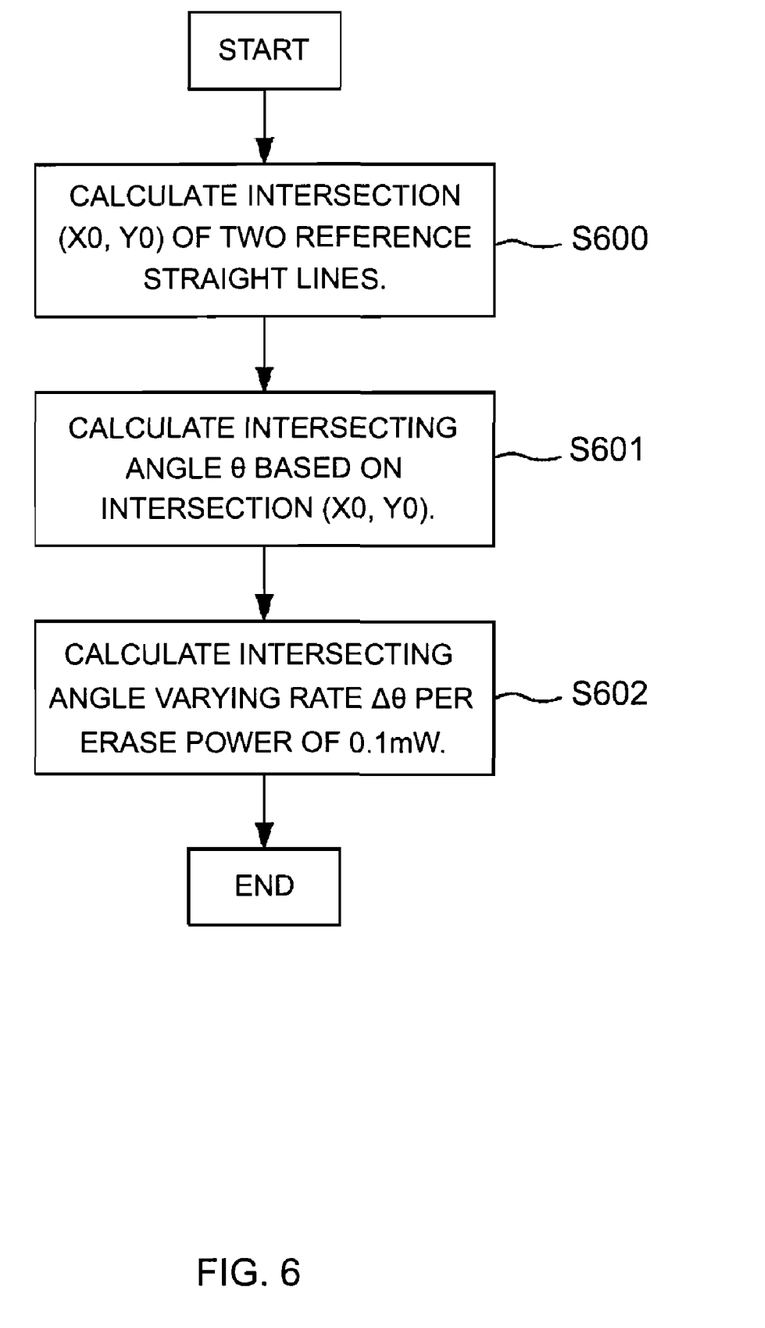
FIG. 6 is an explanatory flowchart of a method of obtaining an intersection and intersecting angle varying rate according to an embodiment of the present invention.

Referring to a flowchart of FIG. 6, description will be given for a method of obtaining the intersection and the intersecting angle varying rate, referring also to FIG. 5 when necessary. The main entity of operation shown in the flowchart of FIG. 6 is, for example, a CPU (not shown) mounted on an external apparatus such as a power meter.

When 1/Epsilon is taken on the X-axis and the APCATT is taken on the Y-axis, the first and the second reference straight lines are expressed by equations of the following Equation 1 respectively.

$$y=a1 \cdot x+b1 \text{ first straight line} \qquad \text{[Equation 1]}$$

$$y=a2 \cdot x+b2 \text{ second straight line}$$

(x0, y0) is the intersection of the first and the second reference straight lines. "y1" is the APCATT when 1/Epsilon is x1 on the first reference straight line and "y2" is the APCATT when 1/Epsilon is x1 on the second reference straight line. In this case, the intersection (x0, y0) of the first and the second straight lines is calculated according to the following Equation 2 (S600)

$$x0=(b2-b1)/(a1-a2) \qquad \text{[Equation 2]}$$

$$y0=(b2-b1) \cdot a1/(a1-a2)+b1$$

The intersecting angle θ1 of the first and the second reference straight lines is calculated according to the following Equation 3 (S601).

$$\theta1=\operatorname{atan}(a2)-\operatorname{atan}(a1) \qquad \text{[Equation 3]}$$

"θ1" calculated according to Equation 3 corresponds to the erasing power PE of an amount of 3.0 mW (10.0 mW–7.0 mW). Therefore, the intersecting angle varying rate Δθ corresponding to the proportionality factor between the erase power PE and the slope of a reference straight line can be calculated by dividing θ1 calculated according to Equation 3 by a predetermined unit of the erasing power PE. It is preferable that the predetermined unit of the erasing power PE is the minimal unit with which the erasing power PE can be adjusted (for example, 0.1 mW) Thereby, fine Epsilon adjustment corresponding to the adjustment sensitivity of the erasing power PE is possible.

The intersecting angle varying rate $\Delta\theta$ per 0.1 mW of the erasing power PE is calculated according to the following Equation 4 (S602).

$$\Delta\theta = \theta 1/(10 \cdot (10.0 \text{ mW} - 7.0 \text{ mW})) \quad \text{[Equation 4]}$$

The intersection (x0, y0) and the intersecting angle varying rate $\Delta\theta$ obtained as above are provided to the digital signal processing circuit 300 together with either one of the first and the second reference straight lines and are stored in the memory 31 with the one line.

<Epsilon Adjustment>

Referring to a flowchart of FIG. 8, description will be given for the Epsilon adjustment of the digital signal processing circuit 300 of the present invention referring also to FIG. 7 when necessary. The main entity of the operation shown in the flowchart of FIG. 8 is the CPU 30 when not mentioned especially. A reference straight line stored in advance in the memory 31 is the first reference straight line. In the description of the flowchart of FIG. 8, for the convenience of the description, the case is described where a non-multi-pulse modulation scheme that does not execute any setting of the bias power PB is employed.

It is assumed that the optical disk 100 is in a state where, to start recording of the optical disk, the optical disk 100 is contained in a disk containing unit (not shown) that the optical disk apparatus 600 has. In this state, the LD 20 is driven based on the bias power PB set in the bias power setting unit 42 and, thereby, reproducing of the optical disk 100 is started. As a result, the identifying data of the optical disk 100 is decoded from ATIP information (in case of a CD-RW medium) or wobbling information (in case of a DVD±RW medium) reproduced from the optical disk 100 and is supplied to the CPU 30.

At this time, the CPU 30 reads the reference value E of the erasing power PE and the Epsilon recommended value, correlated with the identifying data of the optical data 100, from the memory 31 and, thereby, determines the erasing power PE in the Epsilon adjustment this time (hereinafter, "the erasing power Pe this time") and the Epsilon (hereinafter, "the Epsilon this time") (S800).

The CPU 30 continuously reads the first reference straight line, the intersection (x0, y0), and the intersecting angle varying rate $\Delta\theta$ from the memory 31. The CPU 30 calculates a straight line of APCATT vs. 1/Epsilon (hereinafter, "APCATT calculation straight line") with reference to the erasing power Pa this time based on the first reference straight line, the intersection (x0, y0), and the intersecting angle varying rate $\Delta\theta$ read from the memory 31 (S801).

Figure 7:
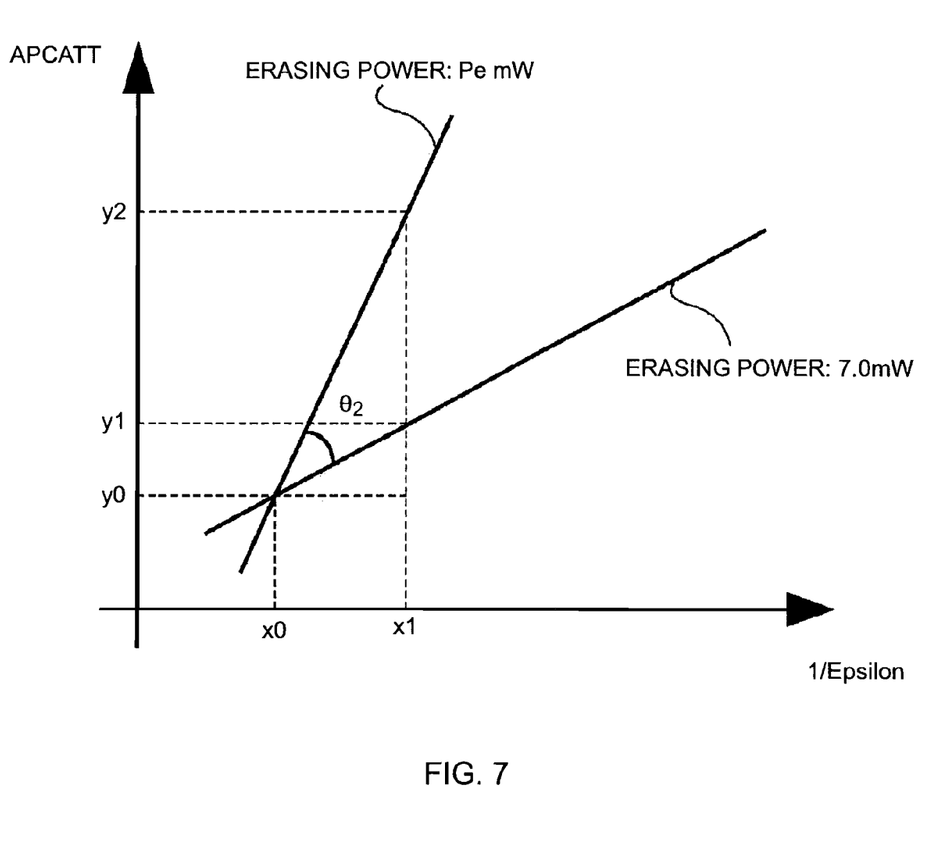
FIG. 7 is an explanatory view of Epsilon adjustment by a laser pulse controlling circuit according to an embodiment of the present invention.
Figure 8:
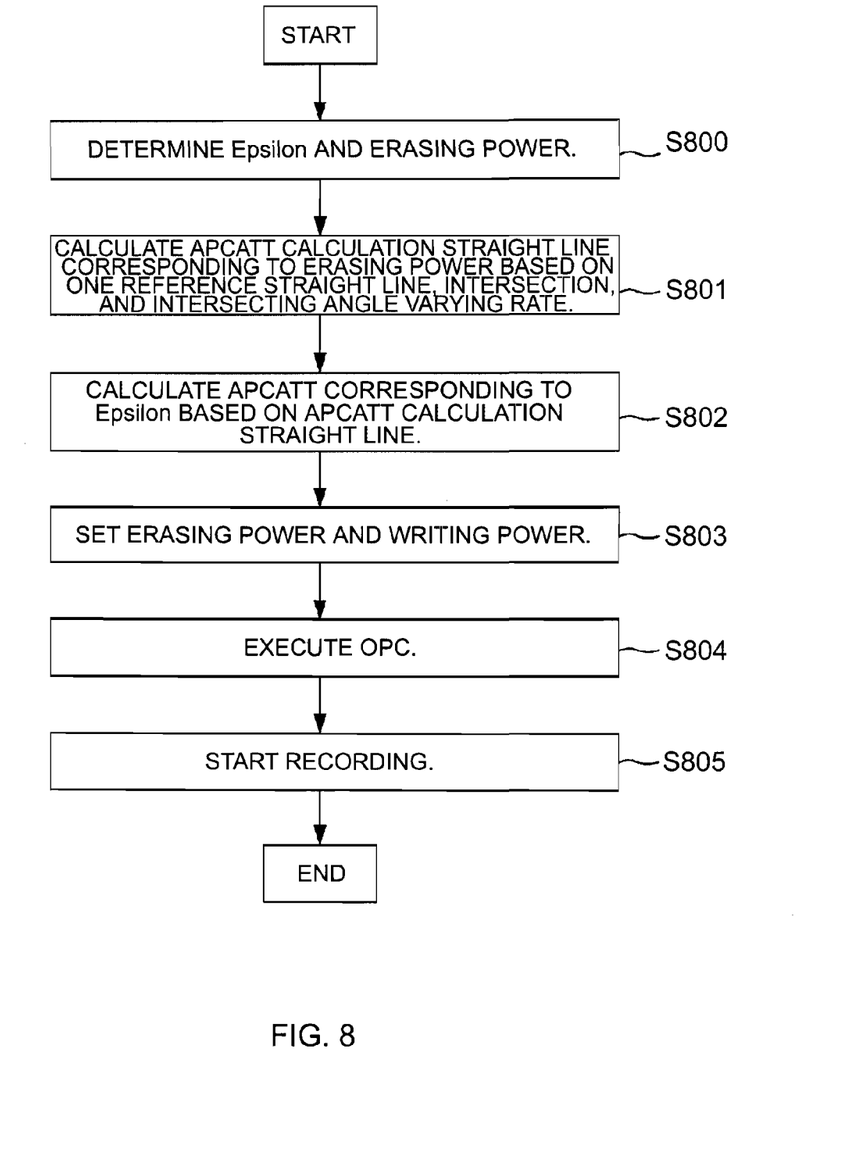
FIG. 8 is an explanatory flowchart of the Epsilon adjustment of the laser pulse controlling circuit according to an embodiment of the present invention.

Referring to FIG. 7, detailed description will be given for a calculating method for the APCATT calculation straight line. The 1/Epsilon is taken on the X-axis and the APCATT is taken on the Y-axis.

The intersecting angle $\theta 2$ between the APCATT calculation straight line and the first reference straight line is calculated according to the following Equation 5.

$$\theta 2 = \Delta\theta \cdot 10 \cdot (Pe \text{ mW} - 7.0 \text{ mW}) \quad \text{[Equation 5]}$$

It is assumed that y1 is an APCATT obtained when x1 is an arbitrary 1/Epsilon on the first reference straight line and y2 is an APCATT obtained when 1/Epsilon on the APCATT calculation straight line is the above x1. Therefore, the APCATT calculation straight line with reference to the erasing power Pe this time is calculated according to the following Equation 6.

$$y2 = y0 + ((x1-x0) \cdot (y1-y0) + (x1-x0)"2 \cdot \tan(\theta 2))/((x1-x0)-(y1-y0) \cdot \tan(\theta 2)) \quad \text{[Equation 6]}$$

For the APCATT calculation straight line expressed by the Equation 6, an inverse of the Epsilon this time is substituted for x1 and values corresponding to x1 is substituted for y1 and y2 respectively and, thereby, the desired APCATT (hereinafter, "the APCATT this time") y2 is calculated (S802).

As a result, the erasing power setting unit 45 produces a voltage controlling signal VEDC to set the erasing power Pe this time and the writing power setting unit 46 produces a voltage controlling signal VWDC level-shifted from the voltage controlling signal VEDC by the APCATT this time (S803).

The switch 47 combines the voltage controlling signal VEDC produced by the erasing power setting unit 45 and the voltage controlling signal VWDC produced by the writing power setting unit 46 based on the switching modulating signal Smod corresponding to the writing strategy of the OPC from the writing strategy unit 322 and, thereby, produces a modulating signal Vmod. The modulating signal Vmod is supplied to the LD driving unit 22 and, as a result, the LD 20 is driven and the OPC process is started (S804). After the OPC process is completed, recording with actual recording data is started (S805).

In this manner, the digital signal processing circuit 300 of the present invention, that is the laser pulse controlling circuit, does not execute adjustment repeatedly for many times based on the FMD observed value as executed in the conventional Epsilon adjustment. However, the circuit 300 determines immediately the erasing power PE corresponding to a predetermined Epsilon and the APCATT (that is, the writing power PW) by calculation based on the regularity such as the proportional relation established between the inverse of the Epsilon and the APCATT; a relation that the straight line representing the proportional relation necessarily passes the one point X for any erasing power PE; and the proportional relation established between the slope of the straight line that correlates the inverse of the Epsilon and the APCATT with the erasing power PE. As a result, the recording can be immediately started. Because the FMD 21 does not intervene in the adjustment of the writing power PW as intervened in the conventional cases, the influence of the precision of the FMD 21 does not need to be received and, therefore, improvement of the precision of the Epsilon adjustment can be facilitated.

In the Epsilon adjustment, by using either one of the first reference straight line and the second reference straight lines, the intersection (x0, y0), and the intersecting angle varying rate $\Delta\theta$, the APCATT calculation straight line is determined in calculation processing executed once. Therefore, the above regularity can be immediately identified and, as a result, the Epsilon adjustment can be executed immediately.

Though the detailed description has been given as above for the exemplary and currently preferred embodiment of the present invention, the concept of the present invention may variously be changed, practiced, and applied and the appended claims are intended to be construed to include such variations except insofar as limited by the prior art.

The invention claimed is:

1. A laser pulse controlling circuit that is connected with a controlling unit having a first illumination level setting unit that sets a first illumination level of a laser device to erase information recorded in an optical disk, and a second illumination level setting unit that sets a second illumination level of the laser device to record information into the optical disk, and that, when the laser device is driven with laser pulses having the first and the second illumination levels, causes the first and the second illumination level setting units to set the first and the second illumination levels corresponding to a predetermined ratio of the first illumination level to the second illumination level, wherein the laser pulse controlling circuit,
based on regularity that
the relation between: a manipulated variable for causing the second illumination level setting unit to execute adjustment of the second illumination level; and the inverse of the ratio, with reference to the first illumination level, is a straight line that necessarily passes one point for a predetermined first illumination level, and that
a slope of the straight line is proportional to the predetermined first illumination level,
calculates the manipulated variable that is correlated with the first illumination level corresponding to the optical disk, and with the inverse of the ratio, and
causes the second illumination level setting unit to set the second illumination level corresponding to the calculated manipulated variable.

2. The laser pulse controlling circuit of claim 1, comprising a storing unit that stores data for identifying the regularity, wherein the laser pulse controlling circuit, when calculating the manipulated variable, uses data for identifying the regularity stored in the storing unit.

3. The laser pulse controlling circuit of claim 2, wherein the data for identifying the regularity is: the one straight line; the one point; the proportionality factor between a slope of the straight line and the first illumination level, and wherein the laser pulse controlling circuit, when calculating the manipulated variable, determines the straight line that is correlated with the first illumination level corresponding to the optical disk, and with the inverse of the ratio, based on the data for identifying the regularity.

4. The laser pulse controlling circuit of claim 2, wherein the laser pulse controlling circuit sets the data for identifying the regularity with the use of two different coordinate data that are sampled for the predetermined first illumination level, and that are determined on coordinate axes of the manipulated variable versus the inverse of the ratio.

5. The laser pulse controlling circuit of claim 1, comprising a storage unit that stores the first illumination level and the ratio correlated with each identifying data of the optical disk, wherein the laser pulse controlling circuit, when calculating the manipulated variable, obtains from the storage unit the first illumination level and the ratio correlated with the identifying data read from the optical disk.

6. The laser pulse controlling circuit of claim 1, wherein the controlling unit comprises:

an APC processing unit that executes an APC (Automatic Power Control) that reduces the deviation between an observed level and a specified level for the first illumination level of the laser device;

the first illumination level setting unit that sets the first illumination level to the specified level based on the deviation; and the second illumination level setting unit that sets the second illumination level to a level which is level-shifted from the set first illumination level by a specified level-shift amount that is the manipulated variable for setting the second illumination level, and wherein the laser pulse controlling circuit,
when the first illumination level is adjusted, specifies the specified level to the APC processing unit, and
when the second illumination level is adjusted, specifies the specified level-shift amount to the second illumination level setting unit.

* * * * *